TRANSISTOR-SYNC SEPARATOR AND AUTOMATIC GAIN CONTROL CIRCUIT
Filed Nov. 5, 1957
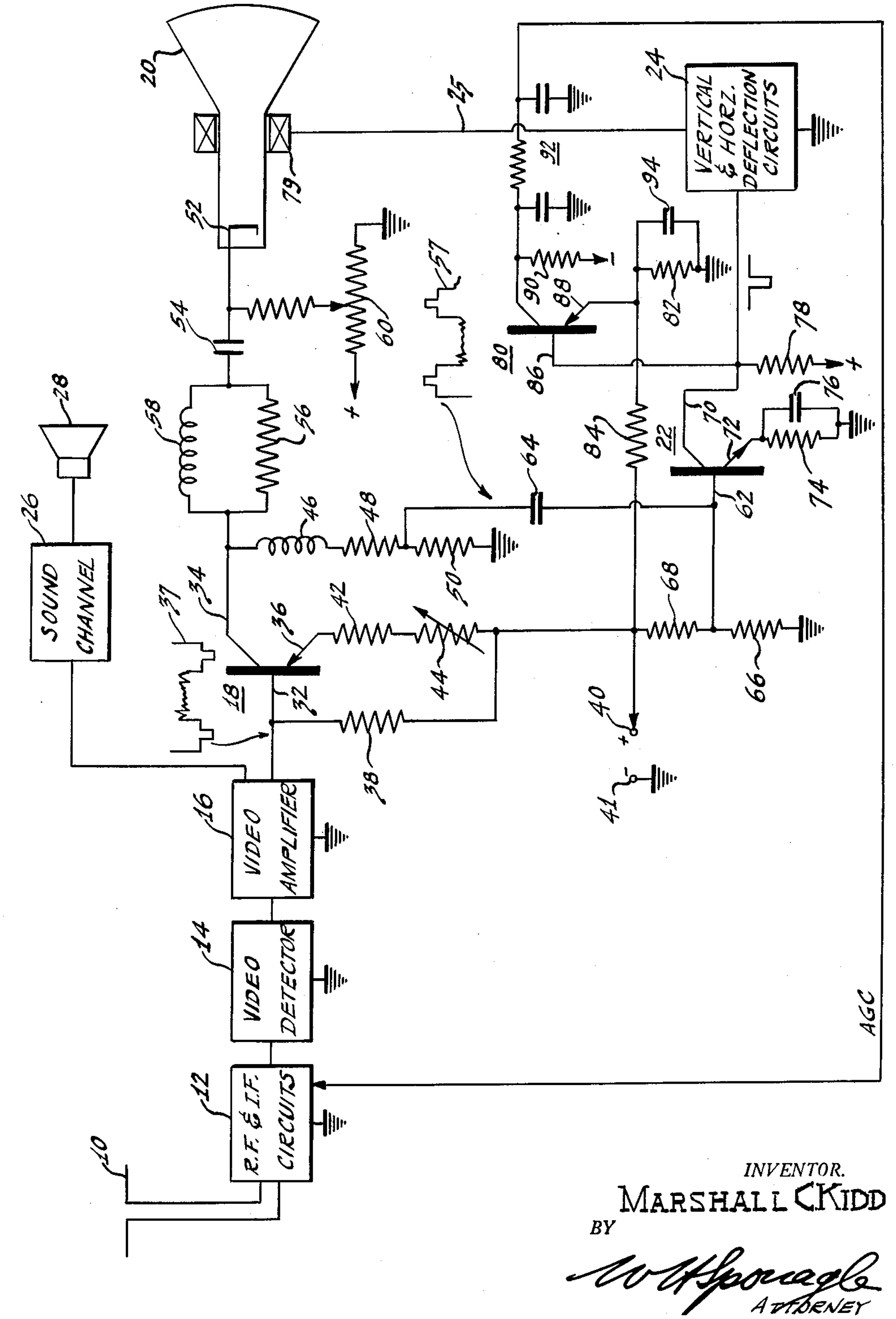
INVENTOR.
MARSHALL C. KIDD
BY
W. H. Sprague
ATTORNEY

United States Patent Office 2,979,563

Patented Apr. 11, 1961

2,979,563

TRANSISTOR-SYNC SEPARATOR AND AUTOMATIC GAIN CONTROL CIRCUIT

Marshall C. Kidd, Haddon Heights, N.J., assignor to Radio Corporation of America, a corporation of Delaware Filed Nov. 5, 1957, Ser. No. 694,577

6 Claims. (Cl. 178—7.3)

The present invention relates generally to electrical signal translating circuits for television receivers and particularly to synchronizing signal separator and automatic gain control circuits employing semi-conductor signal translating devices.

It has long been the practice to provide radio receiving systems with an automatic gain control (AGC) circuit to automatically adjust the gain of the receiving system as an inverse function of the received signal carrier amplitude. In amplitude-modulated sound broadcast radio signal receiving systems this AGC action may be accomplished on the basis of average carrier amplitude since the modulation is substantially symmetrical with respect to an average zero modulation signal level.

In television signal receiving systems, however, the problem is known to be complicated by the fact that the average carrier level, as detected in the receiver, varies as a function of both the received signal amplitude and the direct current component or brightness component of the scene being televised. It is, therefore, necessary to provide an AGC voltage developing circuit which is responsive only to a datum portion of the television signal. This datum portion is usually taken as the peak excursion of the synchronizing pulses which are transmitted as a predetermined percentage of modulation.

Since the synchronizing signal portion of the signal comprises the peak excursions of the composite television waveform, the function of synchronizing signal separation in the receiver has been combined with that of developing an AGC potential. With the advent of transistors, circuits have been devised for sync separator and AGC circuits. For the most part, these circuits have not been integrated into a single composite circuit for effectively utilizing to the fullest extent the properties inherent in the transistor.

It is accordingly an object of this invention to provide an improved composite automatic gain control and synchronizing signal separator circuit for television receivers and the like effectively utilizing semi-conductor devices.

It is another object of this invention to provide an integrated synchronizing signal separator and automatic gain control circuit of simplified construction and improved operation wherein the AGC circuit components also function in the synchronizing signal separator circuit thereby enabling a reduction in the number of component parts required.

In accordance with the invention, a transistor synchronizing signal separator circuit includes biasing means operable to produce a bias in response to collector current which clips or prevents translation of input signals below a minimum threshold level. The synchronizing signal separator circuit includes a load impedance across which the separated synchronizing pulses are developed. An AGC circuit including a transistor amplifier is directly coupled to the load impedance element so that a unilaterally conductive path is provided by the input electrodes of the transistor in parallel with at least a portion of the load impedance element. The unilaterally conductive path is poled and biased to conduct in response to a predetermined change in voltage across the load impedance element to clip signals in excess of a certain amplitude. Since current between the input electrodes of the AGC transistor only flows when the synchronizing signal level is great enough to produce the predetermined change in voltage across the load impedance element, a delayed AGC voltage may be obtained from an output circuit connected with the AGC amplifier.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

The single figure of the drawing is a schematic circuit diagram of a television receiver having an integrated synchronizing signal separator and AGC circuit embodying the invention. Referring now to the drawing, signals intercepted by an antenna 10 are applied to a television receiver radio frequency (R.F.) and intermediate frequency (I.F.) circuits 12 which may include the usual tuning means, radio frequency amplifier, mixer, oscillator, and intermediate frequency amplifier. The received R.F. signal may be amplified in an R.F. amplifier and is heterodyned with a local oscillator signal in a suitable mixer stage to provide a corresponding signal of intermediate frequency. After amplification, the I.F. signal is applied to a video detector 14 where the intermediate frequency signal is detected before being supplied to a video signal amplifier 16. The output signal from the video amplifier 16 is applied to a video output amplifier 18 for further amplification before application to the input electrodes of a kinescope 20. Signals for a sync separation circuit which controls the vertical and horizontal deflection circuits 24 are also supplied by the video output amplifier 18 as will be more fully explained hereinafter.

As is known, the amplitude-modulated video and frequency modulated sound carriers of transmitted television signals are separated by 4.5 megacycles, in accordance with present practice. This separation remains when the received television signal is heterodyned by a mixer to an intermediate frequency signal. The video detector 14 detects the amplitude-modulated video signal and at the same time heterodynes the amplitude-modulated video carrier and the frequency modulated sound intercarrier to produce a frequency modulated sound intercarrier having a center frequency of 4.5 megacycles. The sound intercarrier is translated through the video amplifier 16 and applied to the sound channel 26 of the television receiver where it is amplified, demodulated, and applied to a sound reproducing loud-speaker 28.

The video output amplifier 18 comprises a PNP type transistor having a base 32, a collector 34 and an emitter 36. It is understood that NPN type transistors may be used by suitable rearrangement of the circuitry including the operating potentials applied to the various electrodes without departing from the scope of the invention. The composite video signal from the video amplifier 16 is applied to the base 32 in a manner that the synchronizing signal pulses extend in a negative direction as shown in the waveform 37. The video signal from the amplifier 16 may be developed across input circuit means for the video output amplifier 18 comprising a resistor 38 connected between the base 32 and a terminal 40 which may be the positive terminal of a suitable operating potential supply means. The negative terminal 41 of the operating potential supply means is grounded as indicated. The emitter 36 of the video output transistor is also connected to the terminal 40 through a fixed resistor 42 and a variable resistor 44 which may provide a contrast control for a television receiver.

An amplified replica of the video signal is developed across a collector load impedance for the video output transistor including a peaking coil 46 and two serially connected resistors 48 and 50. This signal which is reversed 180° in phase so that the synchronizing pulse excursions extend in the positive direction as indicated by the waveform 57. This signal is applied to the cathode 52 of the kinescope 20 through a series circuit comprising a coupling capacitor 54 and the parallel combination of an inductor 56 and resistor 58. The proper operating bias potential for the cathode 52 is provided by adjusting the tap on a variable resistor 60 which is connected between ground and the positive terminal of a suitable potential supply means.

The portion of the video signals developed across the video output amplifier load resistor 50 is applied to the base 62 of the sync separator transistor 22 through a coupling capacitor 64. The proper bias potential for the base 62 is provided by a connection to the junction of a pair of serially connected resistors 66 and 68 which form a voltage divider network connected between ground and the terminal 40 of the operating potential supply means.

The sync separator transistor 22 which is shown by way of example as a junction type NPN transistor also includes a collector 70 and an emitter 72. The parallel combination of a resistor 74 and a capacitor 76 is connected between the emitter 72 and ground to form a biasing network which is adapted to develop a potential thereacross in response to the emitter current which maintains the sync separator transistor cut-off for signals having an amplitude less than that of the synchronizing signal component. A load resistor 78 connects the collector 70 of the sync separator transistor to a positive terminal of an operating potential supply means which may if desired be the positive terminal 40. The separated horizontal and vertical synchronizing signals which are developed across the resistor 78 are applied to the vertical and horizontal deflection circuits 24 to control these circuits to produce scanning waves which are in synchronism with that of the transmitted signal. The horizontal and vertical scanning waves are applied through a suitable cable 25 to a deflection yoke 79 positioned on the neck of the kinescope 20.

If the sync separator is to be operated from cut-off to saturation to respectively clip and limit the sync signals, the variable component of the bias developed across the emitter biasing network to maintain the proper transistor cut-off level in response to changes in signal amplitude must come from the transistor base circuit. This is because in saturation, the transistor collector current does not change substantially as the forward biasing current in the base is increased, and accordingly the bias developed as a result of the collector saturation current would be substantially constant.

However, in the circuit of the invention, the impedance through the base of the sync separator transistor is relatively high and the base current variations alone are insufficient to produce the sufficient potential change across the biasing circuit 74—76 needed to maintain the proper transistor cut-off level in response to the changes in the applied signal amplitude.

In accordance with the invention, an AGC amplifier comprising a transistor 80, which is indicated as being a PNP junction type transistor is connected to prevent collector saturation of the sync separator transistor 22 and thereby permits the collector current to vary as a function of sync amplitude. To this end the input circuit of the AGC amplifier transistor 80 is connected between the collector 70 and the junction of a pair of resistors 82 and 84 which are connected between ground and the positive terminal 40 of the operating potential supply means. The values of the resistors 82 and 84 are selected so that the potential at the junction thereof is sufficient to maintain the unilaterally conductive path between the base 86 and emitter 88 of the transistor 80 non-conductive during the interval when the sync separator transistor is cut off. Thus the potential at the junction of the resistors 82 and 84 should be less positive than the +B potential connected to the load resistor 78. The potential difference between the base 86 and emitter 88 in the cut-off condition of the sync separator establishes the maximum amplitude of the sync signal developed across the load resistor 78. Accordingly, the minimum signal amplitude translated by the circuit is determined by the cut-off level of the synchronizing separator transistor whereas the maximum amplitude is determined by the clamping action of the unilaterally conductive path comprising the input circuit of the AGC amplifier 80. Since forward biasing current only flows in the transistor 80 when the synchronizing signal level is great enough to attempt to drive the collector 70 more negative than the potential at the junction of the resistors 82 and 84, a delayed AGC is obtained.

The AGC amplifier includes a load resistor 90 and a filter network 92 including a series resistor and shunt capacitors. During the occurrence of the synchronizing signal pulse interval collector-to-emitter current flows through the transistor 80 causing a potential to be developed across the load resistor 90 which is a function of the peak amplitude of the synchronizing signal applied to the synchronizing signal separator 22. This voltage is filtered by filter network 92 and applied to the R.F. and I.F. circuits 12 to control the gain of the receiver as a function of the signal amplitude in a manner to maintain the video signal level at the kinescope more nearly constant.

In the operation of the integrated sync separator and AGC circuits of the invention, a composite video wave 57 which is polarized so that the synchronizing signal pulses extend in a positive direction, is applied to the base 62 of the sync separator 22 through a coupling capacitor 64. During the occurrence of the synchronizing pulses the emitter to collector current of the sync separator transistor causes a bias to be developed across the bias network 74—76. The values of the biasing network circuit components are selected so that the bias developed is of sufficient magnitude to maintain the sync separator transistor cut-off except for excursions of the video wave extending above the blanking level. When the collector current through the load resistor 78 increases, the potential of the collector 70 decreases. The collector 70 is connected to the base 86 of the AGC transistor 80 and when the collector 70 potential drops to a point where the emitter 88 of the AGC transistor 80 becomes positive with respect to the base thereof, base-to-emitter current will flow in the transistor 80. This diverts the collector 70 current around the emitter 88 through a load impedance path including base 86, emitter 88, and a bypass capacitor 94 thereby enabling the current through the collector 70 to be a function of the applied signal amplitude. Since the collector current is a function of the applied signal amplitude, the bias developed across the network 74—76 will also be a function of the applied signal amplitude. The potential of the collector 70 will not drop substantially below the junction of the resistors 82 and 84 due to the clamping action of the unilaterally conductive path formed by the base 86 and emitter 88, all signals above this level do not affect the output voltage developed across the load resistor 78. However, the current diverted through the input circuit of the AGC amplifier is amplified to develop an AGC voltage for controlling the gain of the television receiver signal channel. Accordingly it can be seen that the AGC transistor 80 performs the dual function of clipping signals in excess of a predetermined maximum amplitude and also operates as an AGC amplifier for the television receiver.

What is claimed is:

1. An integrated synchronizing signal separator and automatic gain control circuit for television receiver comprising a synchronizing signal separator stage including a semi-conductor device with a pair of input electrodes and a third electrode, input circuit means connected between said pair of input electrodes, an output circuit means including a load impedance element connected between said third electrode and one of said pair of input electrodes, biasing circuit means for said semi-conductor device substantially responsive to the third electrode current of said device to develop a bias potential for said pair of input electrodes, an automatic gain control stage including a second semi-conductor device having a pair of input electrodes and a third electrode, means including a circuit connecting the input electrodes of said second semi-conductor device across at least a portion of said load impedance element to prevent saturation in the third electrode current of said synchronizing signal separator semi-conductor device, and means for developing an automatic gain control potential connected with the third electrode of second semi-conductor device.

2. A composite synchronizing signal separator and automatic gain control circuit for television receivers comprising a first semi-conductor device having a pair of input electrodes and a third electrode, input circuit means connected between said pair of input electrodes, biasing circuit means substantially responsive to the current in the third electrode of said device to maintain said device non-conductive in response to signals of an amplitude below a predetermined level, a load impedance element and operating potential supply means connected in series between said third electrode and one of said pair of electrodes, a second semi-conductor device having a pair of input electrodes and a third electrode, means including a circuit connecting said input electrodes of said second semi-conductor device across said load impedance element to provide a unidirectional conduction path to prevent current saturation in said first semi-conductor device, and circuit means connected with the third electrode of said second semi-conductor device to develop a direct potential in response to current in said unidirectional conduction path.

3. In a television receiver a synchronizing signal separator stage comprising a semi-conductor device having base, emitter and collector electrodes, input circuit means connected between said base and emitter electrodes, biasing circuit means substantially responsive to the collector current of said device for developing a bias voltage between said base and emitter electrodes, a load impedance element and operating potential supply means connected in series between said collector and emitter electrodes, an automatic gain control stage including a second semi-conductor device having base, emitter and collecor electrodes, means including the base and emitter electrodes of said second semi-conductor device and a biasing network providing a unidirectional conduction path connected across said load impedance element, such that said unidirectional conduction path is biased to conduct in response to voltage excursions exceeding a predetermined value across said load impedance element, and circuit means connected with the collector electrode of said second semi-conductor device to provide an automatic gain control potential in response to current flowing in said unidirectional conduction path.

4. In a television receiver a synchronizing signal separator stage comprising a signal translating semi-conductor device having base, emitter and collector electrodes, an input circuit connected between said base and emitter electrodes, said input circuit including a biasing network responsive to the total emitter current of said device to provide a biasing potential of an amplitude to maintain said transistor cut-off for signals having an amplitude less than that of the blanking level of a composite video wave, means providing an output circuit including a load impedance element and an operating potential supply connected in series with said biasing network between said emitter and collector electrodes, an automatic gain control stage comprising a signal translating semi-conductor device having base, emitter and collector electrodes, means connecting the base electrode of said last named semi-conductor device with a collector electrode of said first named semi-conductor device, means including a circuit connecting the base-emitter electrodes of the automatic gain control semi-conductor device to said load impedance element to conduct in response to a predetermined potential drop across said load impedance element, and output circuit means connected with the collector of said automatic gain control semi-conductor device.

5. In a television receiver a synchronizing signal separator stage comprising a signal translating semi-conductor device having base, emitter and collector electrodes, an input circuit connected between said base and emitter electrodes, said input circuit including a biasing network responsive to the total emitter current of said device to provide a biasing potential of an amplitude to maintain said transistor cut-off for signals having an amplitude less than that of a predetermined level of a composite video wave, means providing a circuit including a load impedance element and an operating potential supply connected in series with said biasing network between said emitter and collector electrodes, an automatic gain control stage comprising a signal translating semi-conductor device having base, emitter and collector electrodes, means including a circuit connecting the base-emitter electrodes of said automatic gain control semi-conductor device across a portion of the circuit including said load impedance element and said operating potential supply to prevent collector current saturation of said synchronizing signal separator stage transistor, and automatic gain control potential output circuit means connected with the collector of said automatic gain control semi-conductor device.

6. In a television receiver a synchronizing signal separator comprising a transistor having a base, emitter and collector electrodes, an input circuit connected between said base and emitter electrodes, an output circuit including a load impedance element connected between said collector and emitter electrodes, a biasing network common to said input circuit and output circuit, an automatic gain control stage comprising a transistor having a base, emitter and collector electrodes, and means including a circuit connecting the base and emitter of said automatic gain control transistor across a portion of said load impedance element for preventing collector current saturation in said synchronizing signal separator transistor.

References Cited in the file of this patent

UNITED STATES PATENTS

| | | |
|---|---|---|
| 2,673,892 | Richman | Mar. 30, 1954 |
| 2,698,416 | Sherr | Dec. 28, 1954 |
| 2,767,330 | Marshall | Oct. 16, 1956 |
| 2,864,888 | Goodrich | Dec. 16, 1958 |